(12) United States Patent
Chow et al.

(10) Patent No.: US 8,371,524 B2
(45) Date of Patent: Feb. 12, 2013

(54) TORQUE LINK SET

(75) Inventors: Leung Choi Chow, Bristol (GB); Philip Campbell, Stockport (GB); Christopher Neil Wood, Congleton (GB)

(73) Assignee: Airbus Operations Ltd., Bristol (GB)

( * ) Notice: Subject to any disclaimer, the term of this patent is extended or adjusted under 35 U.S.C. 154(b) by 693 days.

(21) Appl. No.: 12/458,242

(22) Filed: Jul. 6, 2009

(65) Prior Publication Data

US 2010/0012778 A1 Jan. 21, 2010

(30) Foreign Application Priority Data

Jul. 10, 2008 (GB) .................................. 0812588.2

(51) Int. Cl.
*B64C 25/16* (2006.01)
(52) U.S. Cl. ..................................... 244/102 A; 244/1 N
(58) Field of Classification Search .................. 244/1 N, 244/100 R, 102 A, 102 R, 102 SL, 102 SS
See application file for complete search history.

(56) References Cited

U.S. PATENT DOCUMENTS 4,027,836 A 6/1977 Seibel
4,359,199 A * 11/1982 Kramer et al. ............ 244/100 R
5,086,995 A * 2/1992 Large ........................ 244/102 R

FOREIGN PATENT DOCUMENTS

| EP | 1 977 969 | 10/2008 |
| GB | 745965 | 3/1956 |
| WO | WO 01/04003 | 1/2001 |
| WO | WO 2004/089742 | 10/2004 |

OTHER PUBLICATIONS

"Aerodynamic Noise." DiracDelta Science & Engineering Encyclopedia. Jun. 30, 2007. Retrieved from http://web.archive.org/web/20070630203356/http://www.diracdelta.co.uk/science/source/a/e/aerodynamic%20noise/source.html.*
Search Report for GB 0812588.2 dated Nov. 7, 2008.
A319/A320/A321 Aircraft Maintenance Manual, 4 pages.

* cited by examiner

*Primary Examiner* — Tien Dinh
*Assistant Examiner* — Michael Kreiner
(74) *Attorney, Agent, or Firm* — Nixon & Vanderhye P.C.

(57) ABSTRACT

An aircraft landing gear (10) includes a torque link set (12) comprising a first fairing (12a) rotatably connected at a first end (18) to a first end (19) of a second fairing (12b). The fairings (12a), (12b) may be arranged to act as first and second torque links. The fairings may be in the form of noise reduction fairings.

15 Claims, 5 Drawing Sheets

TORQUE LINK SET

This application claims priority to British Patent Application No. 0812588.2 filed 10 Jul. 2008, the entire contents of which is hereby incorporated by reference.

The present invention relates to reducing noise on an aircraft landing gear. More particularly, but not exclusively, the invention relates to reducing noise caused by a torque link set on an aircraft landing gear and to a torque link set designed to reduce the noise generated by the interaction of the torque link set and the air flowing past it during flight, landing and/or take-off.

BACKGROUND OF THE INVENTION

It is desirous to reduce the noise generated by aircraft, for example, to lessen disruption or inconvenience, resulting from aircraft noise, caused to the public on the ground near airports. A significant amount of noise is generated by the interaction of the aircraft and the air flowing past it, which results in turbulent flows and consequently noise. It is particularly important to reduce noise created during approach of the aircraft on landing. During approach, a significant contribution to the amount of noise that the aircraft generates is made by the landing gear, which is typically deployed early for landing for safety reasons. The deployment of the landing gear increases drag and assists deceleration of the aircraft. During take-off, noise from the landing gear is a less significant factor because engine noise is generally greater and because the landing gear is generally stowed at the earliest opportunity to reduce drag and aid take-off. During normal flight, the landing gear of an aircraft is typically stowed in a landing gear bay, the bay being completely or partially closed by doors so that the landing gear is not subjected to the air flow.

FIG. 1a of the accompanying drawings shows a landing gear 110 of a prior art aircraft. The landing gear 110 comprises a telescopic landing gear leg 111 having an upper portion 111a and a lower portion 111b, arranged for sliding movement relative to the upper portion 111a. It will be seen that there are many parts of the landing gear 110 that may contribute to the turbulent airflows which cause undesirable noise. The present invention is primarily concerned with reducing noise caused by the torque link set 112, a magnified view of which being shown in FIG. 1b. In the landing gear 110 of FIGS. 1a and 1b, the torque link set 112 is in the form of a simple two-link hinged mechanism connecting the upper portion 111a of the leg 111 to the lower portion 111b, thereby restricting rotational movement of the upper and lower portions 111a, 111b about the axis of the landing gear leg 111. Thus the torque link set 112 acts to transmit torque loads from the upper portion 111a to the lower portion 111b of the landing gear leg 111 and vice versa. The torque link set 112 is arranged so as not to interfere with the normal compression and extension of the landing gear leg 111.

As shown more clearly in FIG. 1b, the torque link set comprises an upper torque link 112a hinged to a lower torque link 112b. The design of the torque links 112a, 112b is traditionally driven by the optimisation of the structural requirement to transmit the necessary torque loads. Thus, as shown in FIGS. 1a and 1b, the links 112a, 112b are typically triangular in plan form with the base of each triangle connecting at two points to the upper and lower leg portions 111a, 111b, respectively. There is also a single point connection 112c at the apexes of the triangles where the two torque links meet. The structural requirement also drives the sectional detail of the links where an H-section profile is used. Lightening holes 114 are provided in the torque links 112a, 112b to reduce mass (the links 112a, 112b are typically machined from metal alloy). The torque links 112a, 112b are typically positioned in front of the landing gear leg 111. The combination of the planform, H-section geometry, lightening holes and the position in front of the leg gives rise to very poor aerodynamic and aero acoustic properties. Much turbulence is generated resulting in undesirable noise. This is made worse by using the links 112a, 112b to clip systems pipe-work 116 to the outside of the torque links 112a, 112b to ensure smooth kink free runs to the lower leg portion 111b.

WO01/04003 describes an aircraft landing gear and apparatus including a plurality of attachments for noise reduction purposes. The attachments are shaped and positioned on the landing gear to deflect air away from noise-inducing components of the landing gear and to permit deflection and articulation movement and also stowage of the landing gear with the attachments in situ. Noise-inducing parts of the landing gear are however still exposed to airflow. The landing gear arrangement of WO01/04003 has a configuration in which torque links are positioned behind the landing gear leg and so are to some extent shielded from the airflow. WO01/04003 discloses the concept of attaching a single fairing attachment to one of a pair of torque links for the purposes of noise reduction. The fairing attachment is bolted onto the torque link by means of bolts and a backing plate. Adding a bolt-on fairing to a torque link in such a way increases mass and increases the number of serviceable components on the aircraft.

U.S. Pat. No. 4,027,836 describes a non-retractable landing gear with two torque links and an afterbody attached to one or both of the torque links in order to reduce drag. The document mentions the possibility of the afterbody and the torque link being formed as an integral member. No detailed disclosure is provided concerning how such an integral member would be formed. It seems therefore that the integral member would simply have the same shape as the embodiments of U.S. Pat. No. 4,027,836, in which the torque links and afterbody are provided as separate members. The integral member would still have two distinct parts to it, despite being integrally formed; namely, an afterbody part for performing the drag-reducing function and torque link parts for performing a structural function. It is assumed that the integrally formed member would be made from the one and same material. Whilst the number of serviceable components of such an arrangement might be less than the arrangement of WO01/04003, it would seem that simply forming the torque links and afterbody as an integrally formed component of the same material would not be a weight-efficient means of providing faired torque links.

The present invention seeks to mitigate the above-mentioned problems. Alternatively or additionally, the present invention seeks to provide an improved aircraft landing gear torque link set.

SUMMARY OF THE INVENTION

The present invention provides a landing gear torque link set comprising a first fairing rotatably connected at a first end to a first end of a second fairing wherein the fairings preferably perform the function of torque links such that there is no need for torque links separate from or in addition to the fairings. By arranging a first fairing rotatably connected to a second fairing it is possible to provide a torque link set that has noise-reduction fairings for reducing noise that might otherwise be caused by the upper and the lower torque links. Also, the fairings may be configured to reduce noise that might otherwise be caused in the region of the rotational connection between the first and second torque links. It is preferred that each torque link is substantially entirely formed by a unitary fairing structure. In the case where the fairings of the apparatus perform the function of torque links, there is no need for torque links separate from or in addition to the fairings. Designing the torque links as fairings (i.e. with the design requirement of noise-reduction as well as the requirement of performing the structural functions of the torque link set) has resulted in a torque link set with improved aeroacoustic properties, which it is believed represent a significant improvement over the torque link with bolt-on fairing attachment disclosed in WO01/04003.

DESCRIPTION OF THE DRAWINGS

By way of example an embodiment of the invention will now be described with reference to the accompanying schematic drawings, of which:

FIG. 4b is a cross-section view of the torque link set taken along the line A-A of FIG. 4a.

DETAILED DESCRIPTION

FIGS. 2a, 2b, 3a and 3b, show a wing-mounted main landing gear assembly 10 including a torque link set 12 according to an embodiment of the invention. The landing gear is arranged to be moveable from a stowed position to a fully deployed position as shown in the Figures.

Figure 3A:
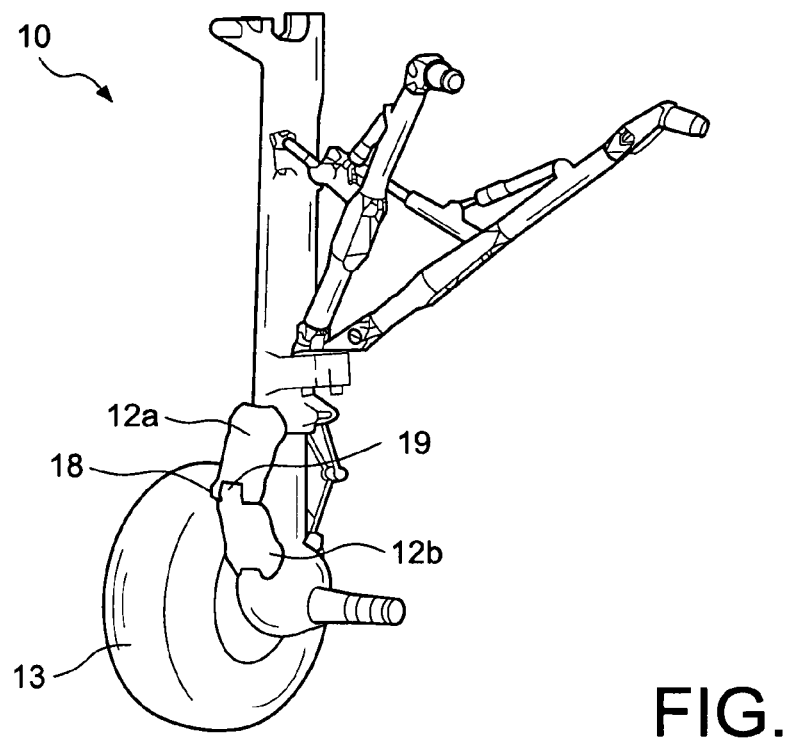
FIGS. 3a and 3b are views showing the landing gear assembly of FIGS. 2a and 2b, but omitting a wheel for the sake of clarity.
Figure 3B:
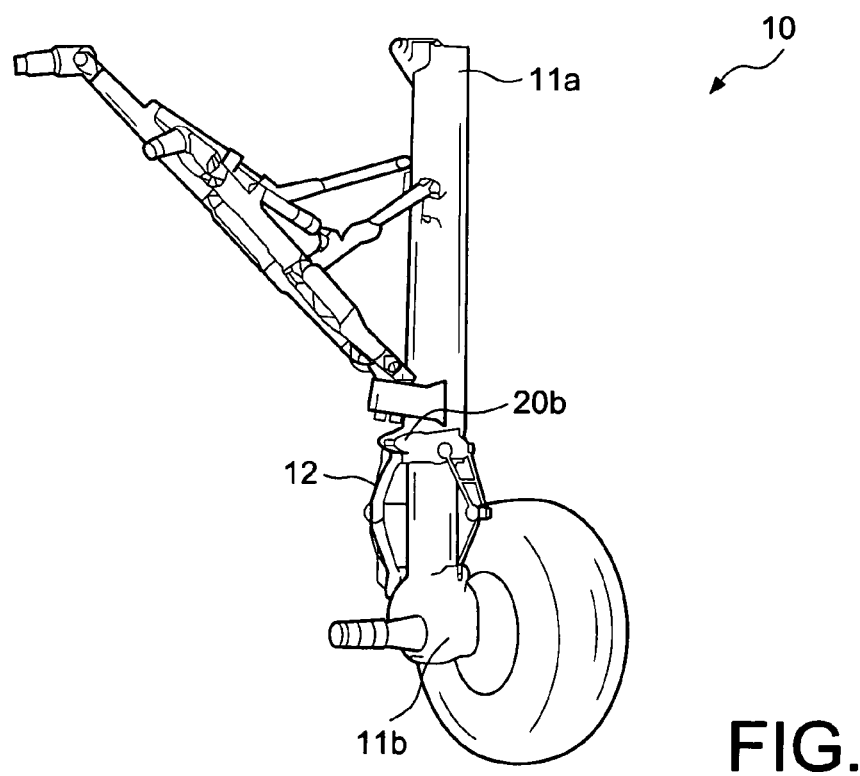
Figure 4A:
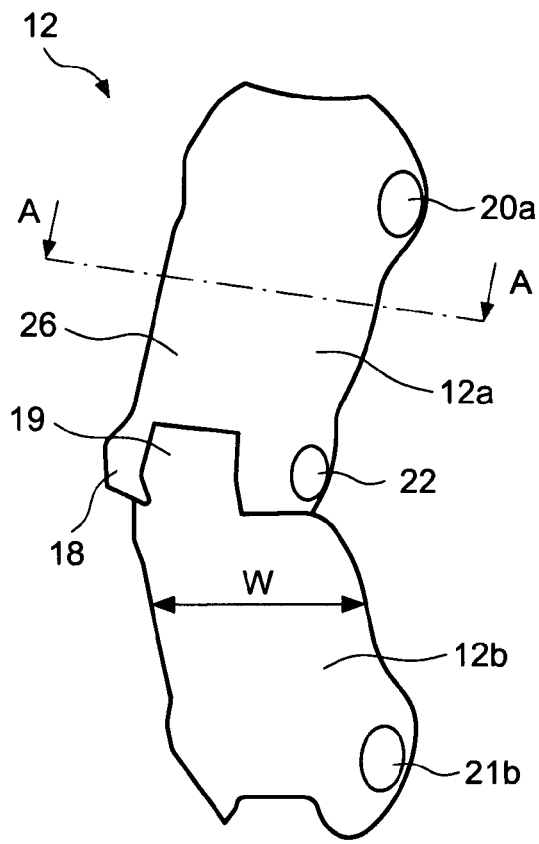
FIG. 4a is a magnified view of part of FIG. 3a showing the torque link set only.

The landing gear assembly 10 comprises a telescopic leg 11 (oleo type) and thus the leg 11 has an upper leg portion 11a arranged for sliding movement relative to a lower leg portion 11b. The lower leg portion 11b supports a wheel assembly 13 comprising two wheels. FIGS. 3a and 3b show the landing gear assembly 10 with one wheel omitted for the sake of clarity. FIG. 4a shows the torque link set 12 by itself. In this embodiment the torque link set 12 is mounted in front of the leg 11.

Figure 1A:
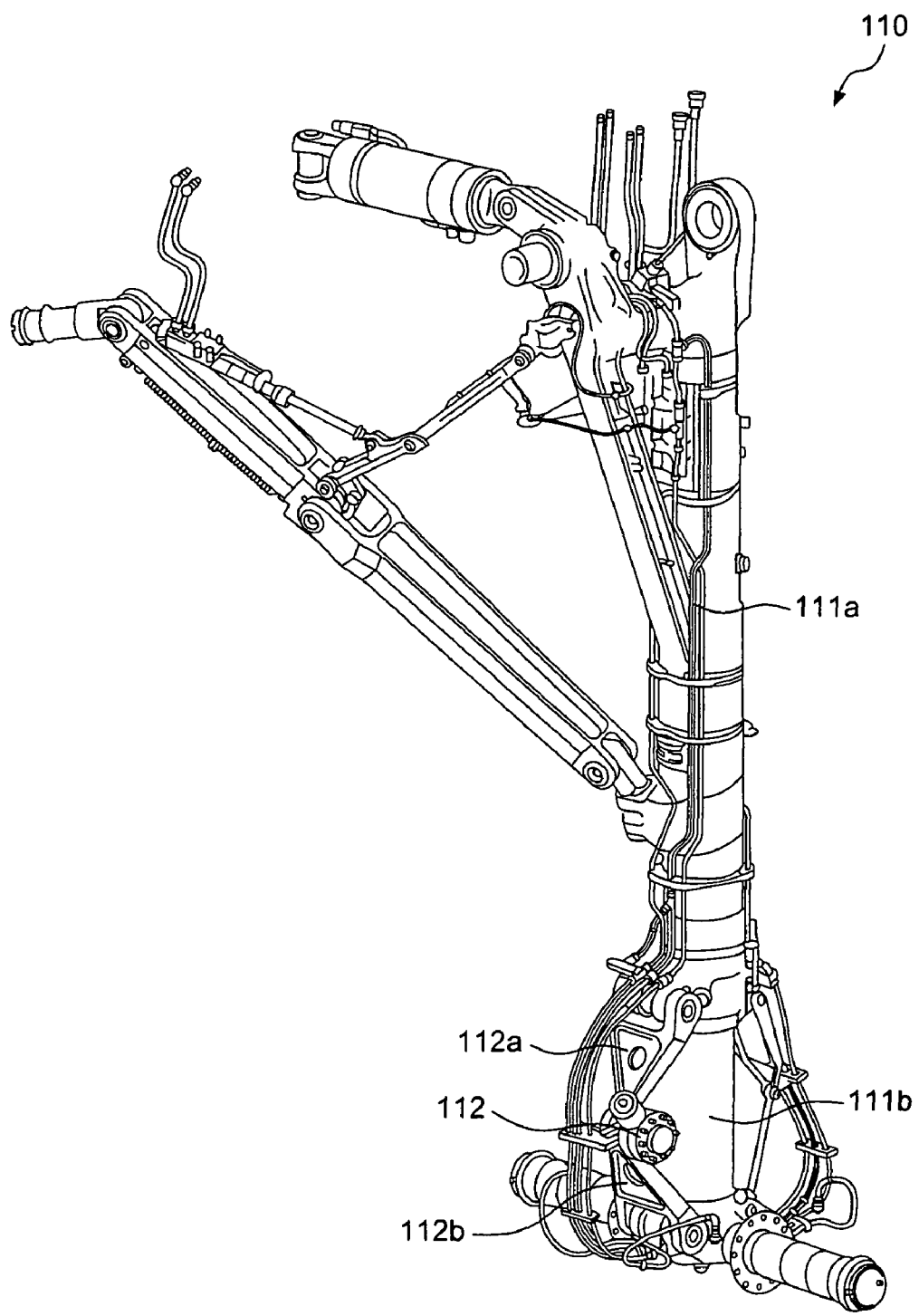
FIGS. 1a and 1b are views of a landing gear assembly of the prior art.
Figure 1B:
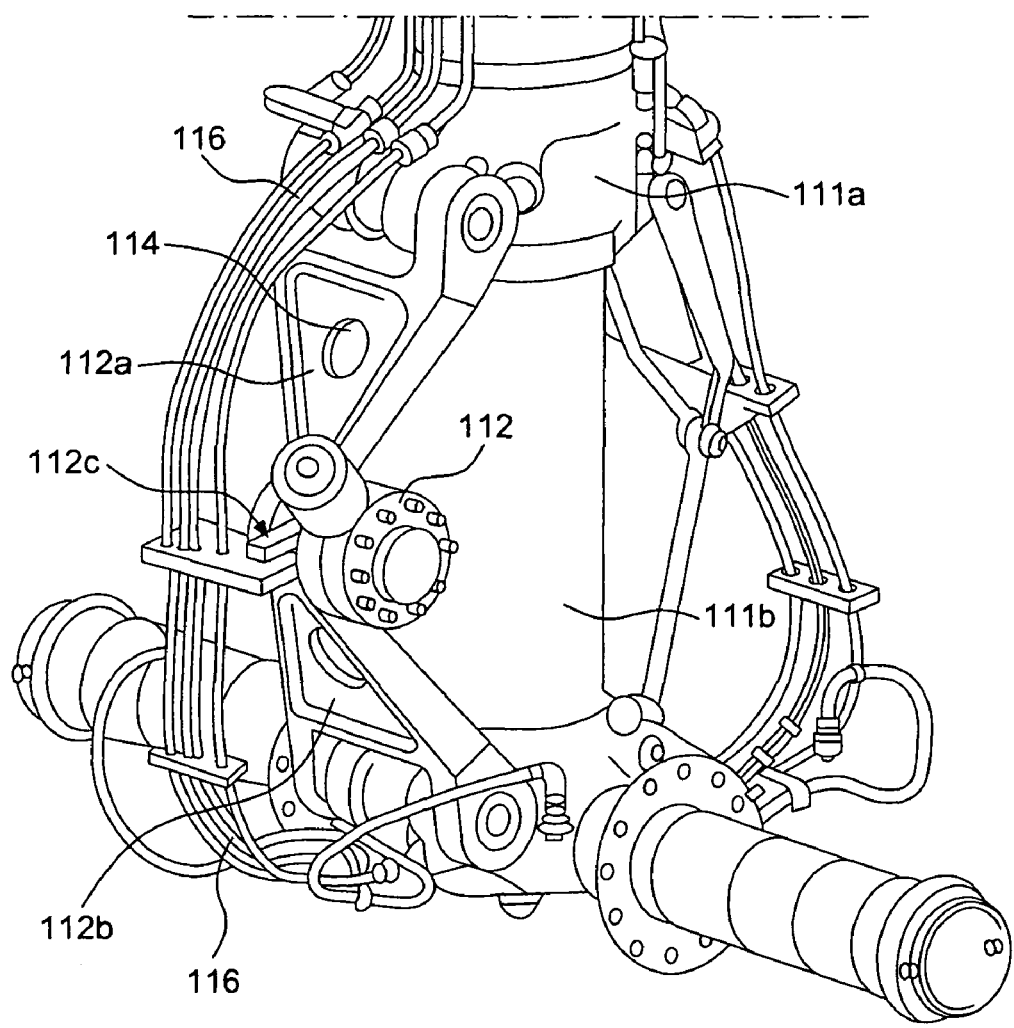
Figure 2A:
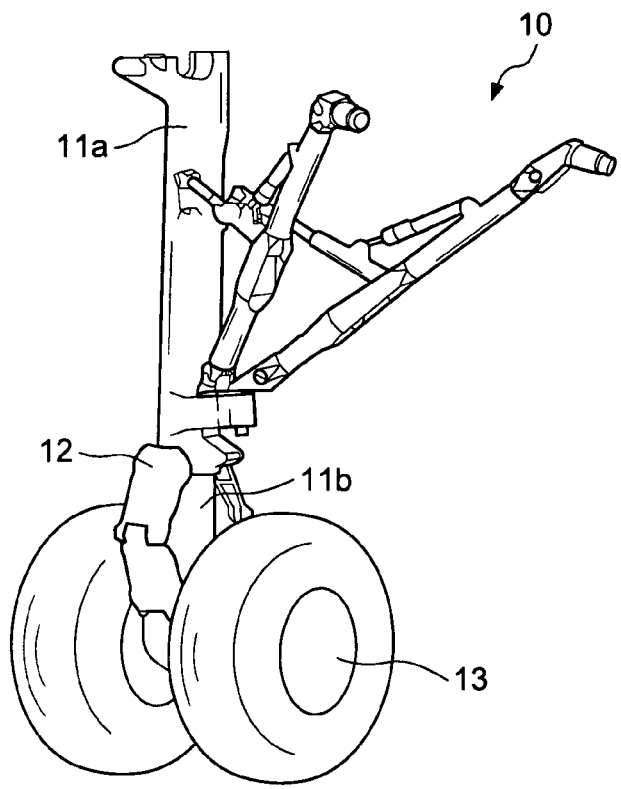
FIGS. 2a and 2b are views showing a landing gear assembly including a torque link set according to an embodiment of the invention.
Figure 2B:
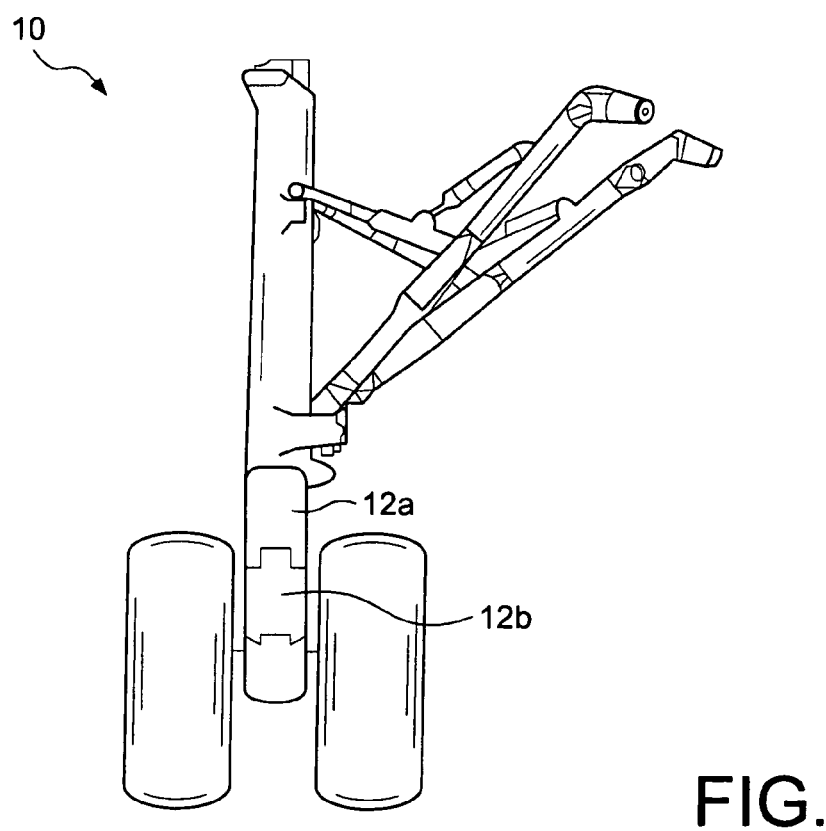

The torque link set comprises an upper noise-reduction fairing 12a rotatably connected at one end 18 to an end 19 of a lower fairing 12b. Each fairing 12a, 12b is sufficiently strong to act as a torque link and is configured to react loads (preferably substantially all of, or at least the majority of, the loads to be reacted by the torque link set during use—i.e. loads resulting from torque loads between the upper leg portion 11a and the lower leg portion 11b) across the structure of the fairing. No components, other than the fairings 12a, 12b, are therefore needed to perform the structural function of the torque links. There is therefore no need to connect the fairings to a separate load-bearing structure that performs the torque link function. The fairings 12a, 12b are shaped to provide a smooth and aero-acoustically efficient fairing shape to the torque link set 12. The torque link set 12 thus performs all the functions of a convention torque link set such as that shown in FIG. 1b, but also acts to deflect airflow in an acoustically efficient manner.

The fairings are both metallic and made from aerospace-grade alloy, such as aluminium alloy. At least 75% of the weight (preferably at least 90%) of the torque link set is formed by the fairings. The fairings are each of one-piece construction. Each fairing may be monolithic in structure.

As a result of the torque link set 12 being mounted in front of the leg, at least a portion of the leg 11 is shielded by the first and second fairings 12a, 12b.

The upper fairing 12a includes a fixing, in this embodiment in the form of part of a hinge attachment 20a (see FIG. 4a), facilitating connection to a corresponding hinge attachment part 20b (see FIG. 3b) of the upper landing gear leg 11a. Similarly, the lower fairing 12b includes a hinge attachment 21b, facilitating connection to a corresponding hinge attachment part of the lower landing gear leg 11b.

The upper fairing 12a includes a further hinge attachment part 22 for forming a hinge connection between the upper and lower fairings 12a, 12b. As can be seen best from FIG. 4a, one end 18 of the upper fairing 12a has a recess in which the end 19 of the second fairing is accommodated. The hinge joint, connecting together the upper and lower fairings, comprises a pin (not shown) which extends from the hinge attachment part 22 on one side of the upper fairing 12a through the end 19 of the lower fairing 12b and to a corresponding hinge attachment part on the opposite side of the upper faring 12a. Thus, the hinge joint extends from one side of the recess to an opposite side of the recess. The hinge joint arrangement enables the first and second fairings 12a, 12b to be mounted for rotation relative to each other in an aero-acoustically efficient manner.

It will be seen from the Figures that the torque link set of the illustrated embodiment has a fairing surface that extends substantially across the entire area of the torque link set that is, in use, exposed to airflow. Each fairing 12a, 12b has a width w that is substantially constant along the length of the fairing. The fairings 12a, 12b are preferably wide enough to shield the landing gear leg 11. In the illustrated embodiment, the fairings each have a width that is substantially equal to the width of the lower landing gear leg portion 11b directly behind the fairings 12a, 12b (when the landing gear is deployed and the leg 11 is fully extended).

Figure 4B:
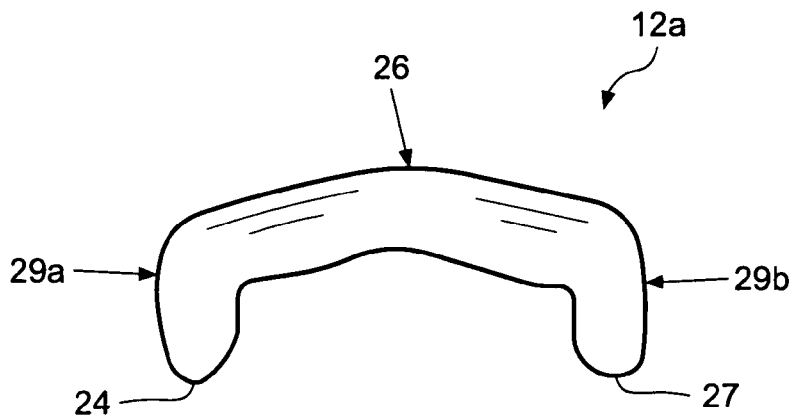

The fairings 12a, 12b also extend rearwardly to cause airflow deflected by the fairings to blend smoothly into the adjacent airflow. Thus, with reference to the schematic cross-sectional view of the upper fairing 12a shown in FIG. 4b, each fairing has an aerodynamically shaped profile which extends from a position 24 on one side of the fairing 12a at an aft position via a forward facing surface 26 to a position 27 on the opposite side of the fairing at an aft position. The fairing may thus be considered as having a forward facing surface 26 which joins two rearwardly extending surfaces 29a, 29b.

The systems pipework and cables (not shown in FIGS. 2a to 4b) which might otherwise generate noise (see for example in FIG. 1a) are routed behind the fairings 12a, 12b, by means of clips on the rear of the fairings 12a, 12b. This ensures smooth kink free runs to the lower leg 11b, as the leg lib extends and contracts relative to the upper leg 11a. The systems pipework and cables may also, by means of being secured behind the fairings, be protected by the fairings, for example from impacts.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The torque link set could be provided behind the landing gear leg. The shape of the fairings would in such a case be different from those illustrated, in view of the different orientation of the upper and lower fairings relative to the airflow.

The fairings could be made from composite material instead of metal alloy.

The illustrated embodiment relates to a wing-mounted main landing gear leg. Torque links are also used on other types of landing gear. The present invention has application to such other types of landing gear, such as for example nose landing gear assemblies.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear torque link set for an aircraft retractable landing gear leg, said leg having telescopic upper and lower portions, said torque link set comprising:
   a first noise reducing fairing, said first fairing having first and second ends, said second end pivotally attached to upper portion of said leg; and
   a second noise reducing fairing, said second fairing having first and second ends, said first end of said second fairing pivotally attached to said first end of said first fairing and said second end of said second fairing pivotally attached to said lower portion of said leg, said first and second fairings configured to perform the function of landing gear torque links such that there is no need for torque links separate from or in addition to the fairings.

2. A torque link set according to claim 1, wherein the first fairing is arranged to act as a first torque link.

3. A torque link set according to claim 2, wherein the second fairing is arranged to act as a second torque link.

4. A torque link set according to claim 3, wherein the first and second fairings are configured to resist substantially all of the loads to be sustained by the torque link set.

5. A torque link set according to claim 1, wherein the first end of the first fairing has a recess and the first end of the second fairing is shaped to fit in the recess, and the first end of the first fairing is rotatably connected to the first end of the second fairing by means of a hinge joint that extends from one side of the recess to an opposite side of the recess.

6. A torque link set according to claim 1, wherein the first and second fairings extend substantially across the entire surface of a portion of the landing gear leg that is exposed to airflow.

7. A torque link set according to claim 1, wherein each of the first and second fairings have an aerodynamically shaped profile which extends from one side of the fairing at an aft position via a forward facing surface to the opposite side of the fairing at an aft position.

8. A torque link set according to claim 1, wherein each of the first and second fairings has a width that is substantially constant along its length.

9. An aircraft landing gear including a torque link set according to claim 1.

10. An aircraft landing gear according to claim 9, wherein the retractable landing gear leg is moveable between a stowed position and a fully deployed position.

11. An aircraft landing gear according to claim 9, wherein the torque link set is arranged in front of the landing gear.

12. An aircraft landing gear according to claim 9, wherein the landing gear has a leg his shielded in use by the first and second fairings.

13. An aircraft landing gear according to claim 12, wherein the width of the fairings is substantially equal to or greater than the width of the landing gear leg directly behind the fairings when the landing gear is fully extended.

14. An aircraft including an aircraft landing gear according to claim 9.

15. A landing gear torque link set for an aircraft landing gear leg, said leg having telescopic upper and lower portions, said torque link set comprising:
   a first noise reducing fairing located in front of said leg, said first fairing having first and second ends, said second end pivotally attached to upper portion of said leg; and
   a second noise reducing fairing located in front of said leg, said second fairing having first and second ends, said first end of said second fairing pivotally attached to said first end of said first fairing and said second end of said second fairing pivotally attached to said lower portion of said leg, said first and second fairings configured to perform the function of landing gear torque links such that there is no need for torque links separate from or in addition to the fairings.

* * * * *